US006389384B1

(12) United States Patent
Hampshire et al.

(10) Patent No.: US 6,389,384 B1
(45) Date of Patent: May 14, 2002

(54) SERVO PROCESSOR CODE EVALUATION USING A VIRTUAL DISC DRIVE

(75) Inventors: Randall D. Hampshire, San Marcos, TX (US); Patiwat Kamonpet, Oklahoma City, OK (US)

(73) Assignee: Seagate Technology LLC, Scotts Valley, CA (US)

(*) Notice: Subject to any disclaimer, the term of this patent is extended or adjusted under 35 U.S.C. 154(b) by 0 days.

(21) Appl. No.: 09/551,418

(22) Filed: Apr. 18, 2000

Related U.S. Application Data (60) Provisional application No. 60/130,316, filed on Apr. 21, 1999.

(51) Int. Cl.[7] .................. G06F 9/455; G11B 5/55; G11B 21/10; G05B 13/04
(52) U.S. Cl. ................. 703/26; 703/22; 318/567; 360/77.06; 360/78.09
(58) Field of Search ............ 703/26, 22; 318/561, 318/567; 360/75, 77.06, 78.09

(56) References Cited

U.S. PATENT DOCUMENTS

| | | | | |
|---|---|---|---|---|
| 4,575,776 A | | 3/1986 | Stephens et al. | 360/78.09 |
| 4,609,855 A | | 9/1986 | Andrews | 318/561 |
| 4,697,127 A | | 9/1987 | Stich et al. | 318/561 |
| 5,262,907 A | | 11/1993 | Duffy et al. | 360/77.5 |
| 5,304,905 A | | 4/1994 | Iwasaki | 318/561 |
| 6,084,738 A | * | 7/2000 | Duffy | 360/75 |
| 6,118,604 A | * | 9/2000 | Duffy | 360/48 |
| 6,157,984 A | * | 12/2000 | Fisher et al. | 711/112 |

FOREIGN PATENT DOCUMENTS

EP  0 774 754 A2  5/1997

OTHER PUBLICATIONS

Zhu et al., Bo. State Truncation Error in Disk Drive Servo Systems,Proceedings of the 2000 American Control Conference, 2000, vol. 5, pp. 3071–3075.*

Ting–Jen et al., Yeh. Modeling and Identification of Opto–Mechanical Coupling and Backlash Nonlinearity in Optical Disk Drives, Proceedings of the 2000 American Control Conference, 2000, vol. 5, pp. 3076–3080.*

Seung–Hi et al., Lee. Modeling and Control of a Dual–Stage Actuator for Hard Disk Drive Servo Systems, Proceedings of the 2000 American Control Conference, 2000, vol. 6, pp. 4254–4258.*

* cited by examiner

*Primary Examiner*—Russell W. Frejd
(74) *Attorney, Agent, or Firm*—Crowe & Dunlevy (57) ABSTRACT

Method and apparatus for evaluating programming used by a programmable processor device in a disc drive to carry out servo control of a head with respect to a rotatable disc. The programming is first generated as a series of instructions executable by the programmable processor device. Processor emulation software is used to simulate execution of the instructions in a computer. A dynamic model of electrical and mechanical portions of the disc drive is generated using plant simulation software. A dynamic linking program is configured to synchronize and transfer data between the processor emulation software and the plant simulation software. All three programs are thereafter simultaneously executed in the computer to evaluate realtime operation of the programming.

16 Claims, 6 Drawing Sheets

SERVO PROCESSOR CODE EVALUATION USING A VIRTUAL DISC DRIVE

RELATED APPLICATIONS

This application claims the benefit of Provisional Application No. 60/130,316 filed Apr. 21, 1999.

FIELD OF THE INVENTION

This invention relates generally to the field of disc drive storage devices, and more particularly, but not by way of limitation, to improvements in the creation and evaluation of disc drive firmware code.

BACKGROUND OF THE INVENTION

Hard disc drives are commonly used as the primary data storage and retrieval devices in modern computer systems. A typical disc drive is configured with a spindle motor to rotate one or more rigid magnetic recording discs at a constant high speed. User data are magnetically stored on tracks defined on the disc surfaces by an array of read/write heads supported by an actuator assembly. An actuator motor, such as a voice coil motor (VCM), is used to rotate the actuator assembly, and hence the heads, across the disc surfaces.

A closed loop, processor-based servo system operates to control disc rotation and the movement of the heads over the disc surfaces. The servo processor (typically a digital signal processor, or DSP) is provided with associated programming to output current command signals to both spindle and actuator driver circuits to adjust the current applied to the spindle motor and the actuator motor.

The servo processor hence carries out three main operations: controlling spindle motor speed; actuator seeking; and actuator track following. Spindle motor control involves sensing initial at rest position of the motor hub, ramping up spindle motor speed, and regulating the speed of the motor within certain tolerances.

A seek involves the movement of a selected head from an initial track to a destination track on the corresponding disc surface. At the beginning of a seek, the processor calculates an appropriate velocity profile indicative of a desired trajectory for the head based on the length of the seek (i.e., the number of tracks from the initial track to the destination track). Thereafter, the processor repetitively determines velocity error as the difference between the desired velocity and the actual velocity of the head, and outputs current command signals to cause the head to follow the desired velocity trajectory and come to rest over the destination track.

Track following involves the continued positioning of the head over a selected track. During track following, the processor receives position inputs from servo data transduced from the track and outputs appropriate current command signals to maintain the head in a desired relation to the selected track (such as over the center of the track). It will be noted that data are written to and read from data blocks (sectors) on the track during track following. Processor based servo systems are discussed, for example, in U.S Pat. No. 5,262,907 issued to Duffy et al., assigned to the assignee of the present invention.

In order to carry out the requisite servo control functions, the programming used by the servo processor must be generally tailored to the particular electromechanical response characteristics of the drive. While the basic layout of the servo processor programming (also referred to as "firmware" and "code") can be developed concurrently with other disc drive design functions, typically the programming cannot be fully written and debugged until after the mechanical configuration of the disc drive (actuator, discs, spindle motor) and the relevant electrical configuration of the disc drive (motor driver, servo data demodulator) become available, at least at an engineering prototype level. Hence, servo code development and debug operations have undesirably added significant time to the design cycle for new generations of disc drive products.

With continued demand for disc drives with ever increasing levels of data storage and transfer performance, the production "life" of each new disc drive product becomes increasingly shorter and is now on the order of only a few months. Thus, disc drive manufacturers are continually challenged to develop and introduce new disc drive products to the marketplace in very tight timing windows. There is therefore a significant need for improvements in the manner in which new disc drives are designed and evaluated, and it is to such improvements that the present invention is directed.

SUMMARY OF THE INVENTION

The present invention is directed to a method and apparatus for evaluating programming used by a programmable processor device in a disc drive to carry out servo control in a disc drive.

In accordance with preferred embodiments, the programming is first generated as a series of instructions executable by the programmable processor device. Commercially available, "off-the-shelf" processor emulation software is used to simulate execution of the instructions in a computer. A dynamic model of electrical and mechanical portions of the disc drive is generated using commercially available, off-the-shelf plant simulation software. A dynamic linking program is configured to synchronize and transfer data between the processor emulation software and the plant simulation software. All three programs are thereafter executed simultaneously in the computer to evaluate real-time operation of the programming.

In this way, the servo processor programming can be written and debugged before engineering prototypes are physically available. Moreover, extensive tolerance stack evaluation can be performed to improve the disc drive design configuration without the need to create multiple physical drives and test the drives under laboratory conditions for extended periods of time.

These and various other features as well as advantages which characterize the present invention will be apparent from a reading of the following detailed description and a review of the associated drawings.

BRIEF DESCRIPTION OF THE DRAWINGS

FIG. 6 is a control block representation of the dynamic plant model of the disc drive used by the plant model simulation software.

DETAILED DESCRIPTION

Figure 1:
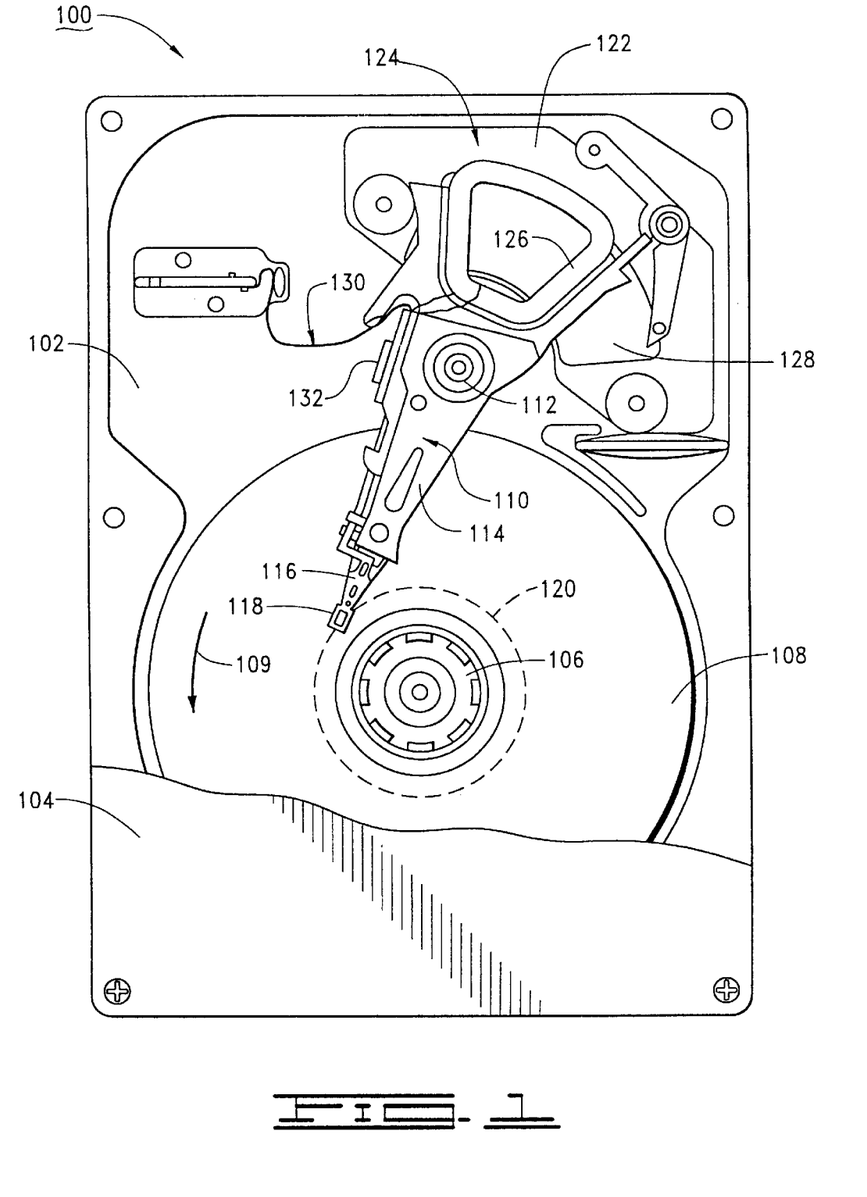
FIG. 1 shows a top plan view of a disc drive designed and constructed in accordance with preferred embodiments of the present invention.

In order to provide a detailed description of various preferred embodiments of the present invention, reference is first made to FIG. 1, which provides a top plan view of a disc drive 100 of the type used to interface with a host computer to magnetically store and retrieve user data. The disc drive 100 includes a base deck 102 to which various components of the disc drive 100 are mounted. A top cover 104 (shown in partial cutaway fashion) cooperates with the base deck 102 to form an internal, sealed environment for the disc drive.

A spindle motor (shown generally at 106) is provided to rotate a plurality of axially-aligned, rigid, magnetic recording discs 108 at a constant velocity (in thousands of revolutions per minute) as indicated by vector 109. User data are written to and read from tracks (not designated) on the discs 108 through the use of an actuator assembly 110, which rotates about a bearing shaft assembly 112 positioned adjacent the discs 108.

The actuator assembly 110 includes a plurality of rigid actuator arms 114 which extend toward the discs 108, with flexible suspension assemblies 116 (flexures) extending therefrom. Mounted at the distal end of each of the flexures 116 is a head 118 which includes a slider assembly (not separately designated) designed to fly in close proximity to the corresponding surface of the associated disc 108. The heads 118 are preferably characterized as magneto-resistive (MR) heads each having a thin-film inductive write element and an MR read element.

When the disc drive 100 is not in use, the heads 118 are moved over and come to rest upon landing zones 120 near the inner diameter of the discs 108 and the actuator assembly 110 is secured using a magnetic latch assembly 122.

The radial position of the heads 118 is controlled through the use of a voice coil motor (VCM) 124, which includes a coil 126 attached to the actuator assembly 110 as well as a permanent magnet 128 which establishes a magnetic field in which the coil 126 is immersed. A second magnetic flux path is disposed above the permanent magnet 128, but has not been shown for purposes of clarity. The heads 118 are moved across the surfaces of the discs 108 through the application of current to the coil 126.

A flex assembly 130 provides the requisite electrical connection paths for the actuator assembly 110 while allowing pivotal movement of the actuator assembly 110 during operation. The flex assembly 130 includes a preamplifier/driver circuit 132 (preamp) which applies write currents to the write elements of the heads 118 during a write operation and applies read bias currents to the MR read elements of the heads 118 during a read operation. The preamp 132 further amplifies readback signals obtained during a read operation and 110 provides the same to disc drive control electronics (not shown) disposed on a disc drive printed circuit board (PCB) attached to the underside of the base deck 102.

Figure 2:
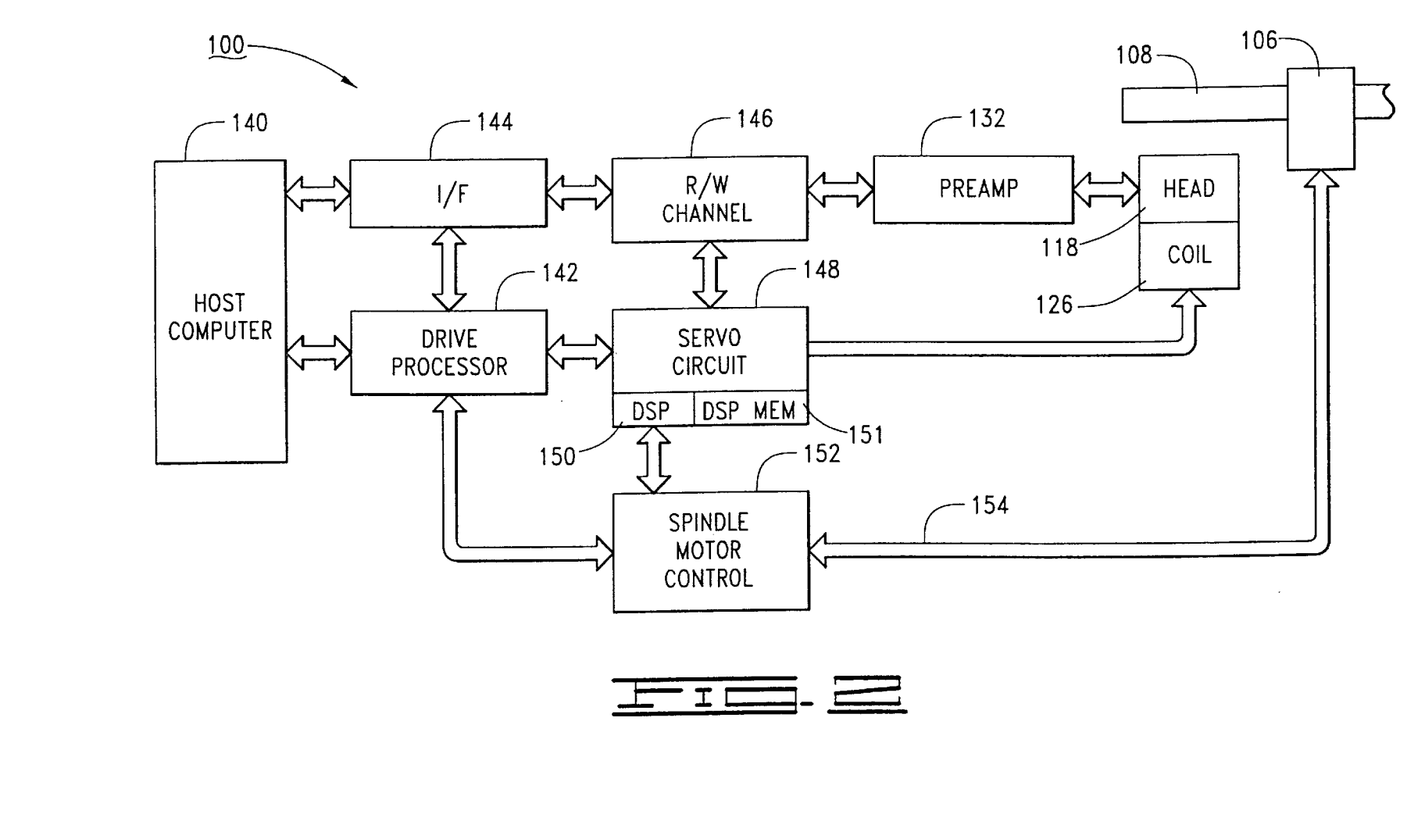
FIG. 2 provides a functional block diagram of the disc drive of FIG. 1 including servo processor (digital signal processor, DSP), the programming of which is evaluated in accordance with preferred embodiments of the present invention.

FIG. 2 shows a functional block diagram of the disc drive 100 of FIG. 1, in conjunction with an associated host computer 140. The disc drive 100 includes a drive processor 142 which carries out top level control functions for the drive. User data to be stored to the discs 108 are passed from the host computer 140 to an interface (I/F) circuit 144 which buffers and sequences the data, a read/write (R/W) channel 146 which encodes and serializes the data, and the preamp 132, which applies a series of alternating write currents to a write element of the head 118 in order to selectively magnetize the disc 108. During a read operation, the preamp 132 applies a read bias current to a read element of the head 118 and transduces the selective magnetization of the disc 108 in relation to changes in voltage across the read element. This results in readback signals correlated to the originally written data. The readback signals are decoded by the R/W channel 146 and passed via the I/F circuit 144 to the host computer 140.

FIG. 2 further shows a servo circuit 148 which receives readback signals from servo data written to the discs 108 and, in response, applies current to the coil 126 in order to control the position of the heads 118. The servo circuit 148 is shown to be processor-based, in that the circuit includes a digital signal processor (DSP) 150 with associated programming stored in memory (MEM) 151. Finally, FIG. 2 provides a spindle motor control circuit 152 which, in response to commands from the DSP 150, applies multiphase currents to the spindle motor 106 to rotate the discs 108.

Figure 3:
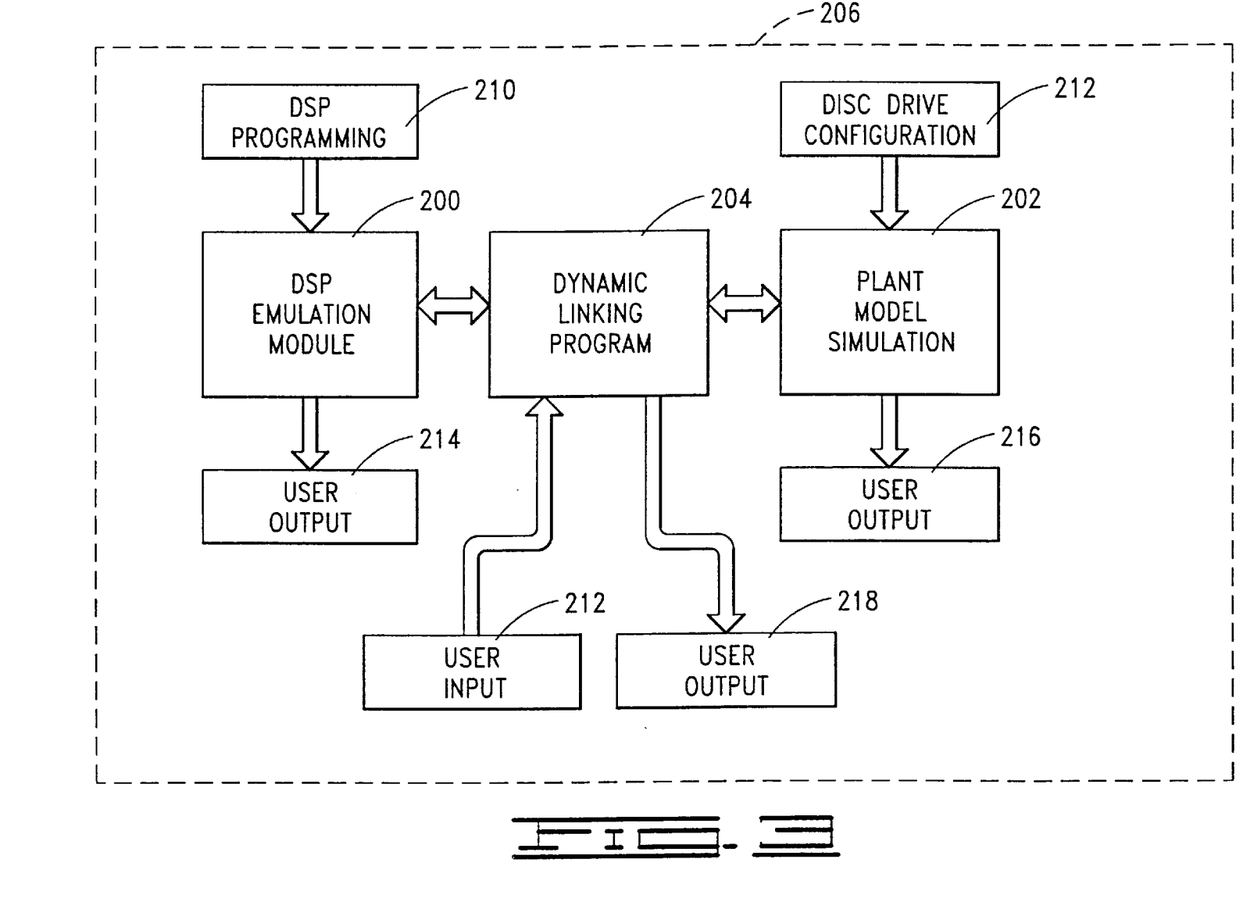
FIG. 3 is a functional diagram of a computer which stores and executes processor emulation software, plant model simulation software, and a dynamic linking program in accordance with preferred embodiments.

FIG. 3 presents a block diagram of various software programs that are used in the development and evaluation of the DSP programming. Attention is first directed to a DSP emulation module 200, which will be recognized as an "off-the-shelf" personal computer (PC) based software program available from the manufacturer of the DSP 150, which operates as a development tool by emulating the function of the DSP 150. That is, a code developer can write the DSP programming in an appropriate source code language, compile a machine executable instruction set, and then execute the code in a controlled, step-wise fashion by the emulation module 200.

The emulation module 200 advantageously operates, as will be readily understood by those skilled in the art, to step through each instruction in turn and display commands, register and memory contents, error messages, etc., as desired. For reference, a suitable DSP 150 is the CMS320C2700 Digital Signal Processor available from Texas Instruments, Dallas, Tex., USA, in which case the associated emulation module 200 comprises the CMS320C2700 Simulator Software from the same source.

The CMS320C2700 Simulator Software operates in a Microsoft Corporation Windows® operating system environment (such as Windows NT® version 4.0) and allows the creation of a user-defined interface subroutine that is called once every processor cycle and can be used to modify the state of the simulated processor, modify memory locations, and output data regarding the simulation. FIG. 3 illustrates such a user-defined interface subroutine ("DSP I/F") at 201, which is preferably characterized as a Dynamic Link Library (*.dll) file and is integrated into the DSP emulation module 200. As will be recognized by those skilled in the art, a *.dll file allows linking at real-time and executes call functions and data input/output (I/O) transfer functions. It will be recognized that a variety of DSPs are commercially available from a number of different sources with corresponding emulation modules with similar features.

FIG. 3 further shows a plant model 202 (also referred to as "disc drive module"), which is a dynamic simulation software routine configured to mathematically model the relevant electromechanical configuration of the disc drive 100. The plant model 202 is also preferably generated using an "off-the-shelf" software package commonly used by disc drive manufacturers to model and evaluate disc drive mechanical and electrical response characteristics. For reference, a suitable simulation software package is the Simulink® Dynamic System Simulation Module for Matlab, available from The Mathworks, Inc., Natick, Mass., USA. The Simulink® Module also operates in a Microsoft Corporation Windows® operating system environment (such as Windows NT® version 4.0).

The Simulink® Module also allows users to write a user-defined programming subroutine that is called once every simulation step, to allow modifications to the state of the simulated dynamic system to affect the outcome of the simulation. Data transfers can also be facilitated by such subroutines, as desired. FIG. 3 shows a user-defined interface subroutine ("Plant I/F") at 203, which is incorporated into the plant model simulation and is preferably characterized as a *.dll file.

A dynamic linking program 204 (also referred to as a "link") provides dynamic linking, or interfacing, between the DSP emulation module 200 and the plant model 202. The link 204 is preferably characterized as an executable program (*.exe) file which also operates in a Microsoft Corporation Windows® operating system environment (such as Windows NT® version 4.0). As discussed more fully below, the link 204 establishes and regulates the respective simulation timing of the emulation module 200 (execution cycles) and the plant model 204 (time steps), passes data between these two modules, and generates interrupts for the emulation module 200. The DSP I/F 201, Plant I/F 203 and link 204 are preferably written using Visual Basic C++ v6.0 or other suitable programming language and subsequently compiled into the desired formats.

Initially, the emulation module 200, plant model 202 and the link 204 are loaded and operated in a computer (represented by dashed box 206) running the aforementioned Microsoft Corporation Windows NT® operating system, as the Windows NT® operating system advantageously permits the simultaneous execution of multiple programs. DSP programming to be evaluated (represented at 208) is provided to the emulation module 200. Disc drive configuration information describing the disc drive design (represented at 210) is provided to the simulation software to form the plant model 202. The user inputs the desired ratio of execution cycles to time steps (as indicated by input block 212), and then executes the programs.

At each respective step, system states are provided from the plant model 202 as inputs to the emulation module 200 and current command signals are provided from the emulation module 200 as inputs to the plant model 202. Output data are also generated (as desired) by the programs, as represented by blocks 214, 216 and 218, respectively. By way of example, the emulation module 200 can write a file showing the executed steps and register contents, the plant model 202 can display velocity, position and current waveforms, and the link 204 can write a transfer file showing the data passed during the simulation operation.

Figure 4:
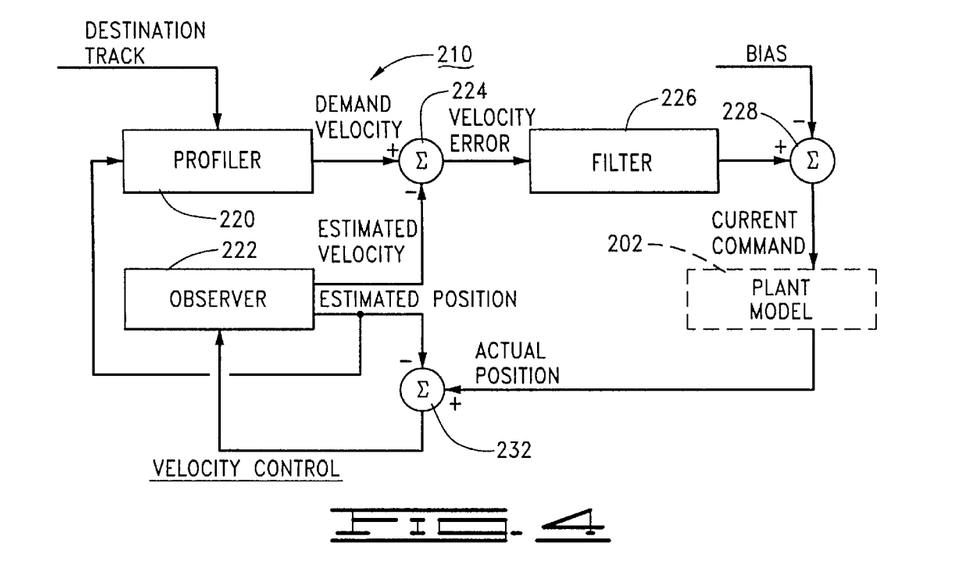
FIG. 4 is a control block representation of programming of the servo processor used to effect velocity control, such as during a seek.
Figure 5:
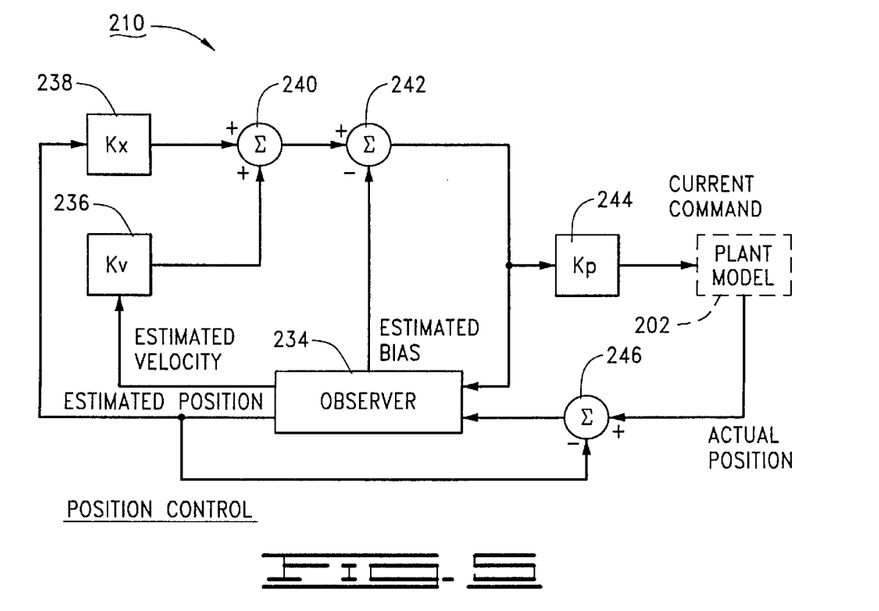
FIG. 5 is a control block representation of programming of the servo processor used to effect position control, such as during track following.

FIGS. 4 and 5 are simplified functional block diagrams generally representative of the DSP programming 210 evaluated by the emulation module 200 of FIG. 3. Particularly, FIG. 4 represents portions of the code used during a velocity controlled seek. A profiler block 220 outputs a velocity profile as a sequence of demand velocities. An observer 222 operates as a mathematical model of the plant model 202 and provides estimates of head position and velocity. The estimated velocity is summed with the demand velocity at summing junction 224 to generate a velocity error which is filtered by notch filter 226. The output of the filter 226 is summed with a bias value at summing junction 228 to form a current command signal which is provided to the plant (plant model). Servo data transduced by the head are demodulated (by the plant model) to provide an actual position signal, which is summed with the estimated position at summing junction 232 to provide feedback to the observer 222.

FIG. 5 represents portions of the code used during position control operation, such as during track following. An observer 234 outputs velocity and position estimates which are multiplied by respective gains Kv, Kx at gain blocks 236, 238 and the resulting products are summed at summing junction 240. Estimated bias from the observer 234 is summed at summing junction 242 and the output is fed back to the observer, as well as through a primary servo gain block 244 (with gain Kp) to generate a current command signal to the plant (plant model). As before, servo data transduced by the head are demodulated (by the plant model) to provide an actual position signal, which is summed with the estimated position at summing junction 246 to provide feedback to the observer 234.

FIG. 6 is a simplified functional block diagram of the disc drive configuration 212 used to form the plant model 202 of FIG. 3. It will be understood that FIG. 6 provides an accurate, high order model of various physical electrical and mechanical components of the disc drive 100 that were previously illustrated and discussed in FIGS. 1 and 2.

The emulation module 200 provides the aforementioned current command signals as a sequence of digital values to a pulse width modulation (PWM) digital-to-analog (D/A) converter 250, which converts the input digital values to corresponding analog values. A PWM transfer function block 252 models the response characteristics of the PWM converter 250, and a head/disc assembly (HDA) delay block 254 models the physical delay by the electrical mechanical portions of the disc drive 100. The resulting analog current command signals are passed to a power amplifier 256, which generates the coil currents which are applied to a HDA mechanical block 258 representative of the actuator 110 and the discs 108 (FIG. 1). External disturbances (such as vibrations, tolerance effects, etc.) can be selectively introduced to model various real-world conditions by disturbance block 260.

The output from the HDA mechanical block 258 is provided to a demodulation (demod) block 262 which, as discussed above, conditions servo data read from the discs to provide servo data positional inputs to the emulation module 200. These inputs include actual position as well as track address information (Gray code), index information, etc. as desired. The demod 262 generally models the operation of the demod 148 of FIG. 2.

It will be recalled from FIG. 2 that the DSP 150 provides spindle motor speed control to control the rotational speed of the spindle motor 106. The control programming used to provide this function can be readily implemented and so has not been included in the representations of the DSP programming of FIGS. 4 and 5. It will be sufficient to note that a spindle motor speed correction signal is provided from the emulation module 200 to a PWM (D/A) converter 264 to generate a driver signal used by a spindle motor driver block 266 to apply current to a spindle motor block 268 (which simulates the spindle motor 106).

During spindle motor rotor position sensing, rise-time measurement of actual spindle motor current responding to command current driven by the spindle motor driver block 266 is measured for each of six commutation states by motor timer block 270. The results are fed back to the DSP emulation module 200 so the at rest rotor position, start-up current and initial driving commutation phase can be calculated. Then during spindle motor speed ramp up, the motor timer block 270 provides measurements of spindle motor commutation period to the DSP emulation module 200 to allow execution of appropriate speed control commands to ramp up the spindle motor until the desired speed is reached. During subsequent operation, angular positioning information is fed from the spindle block 268 to the demod 262 so that the demod 262 receives both radial positioning information for the head relative to the disc, as well as angular positioning information indicative of the rate at which the disc rotates under the head.

From FIGS. 4–6, it will now be understood that the data exchanges facilitated by the link 204 include the current command signals and spindle motor speed correction signals from the emulation module 200 to the plant model 202, and position information from the plant model 202 to the emulation module 200. Prior art, separate utilization of these programs has typically involved the generation of "data files" that provide the requisite input data that are then used by the programs to execute. By contrast, the link 204 allows the two programs to dynamically calculate the next input data set for the other program.

The link 204 further synchronizes the operation of the respective modules; the emulation module 200 will execute the DSP code at a selected rate (processor cycles), and the plant model 202 will simulate the response of the system in time steps (on the order of microseconds). Typically, the DSP code will execute several instructions for each corresponding time step from the plant. Thus, during operation the link 204 will provide the respective inputs to the two programs, allow both to step through the respective number of cycles or time steps, and generate the necessary processor interrupts.

Figure 7:
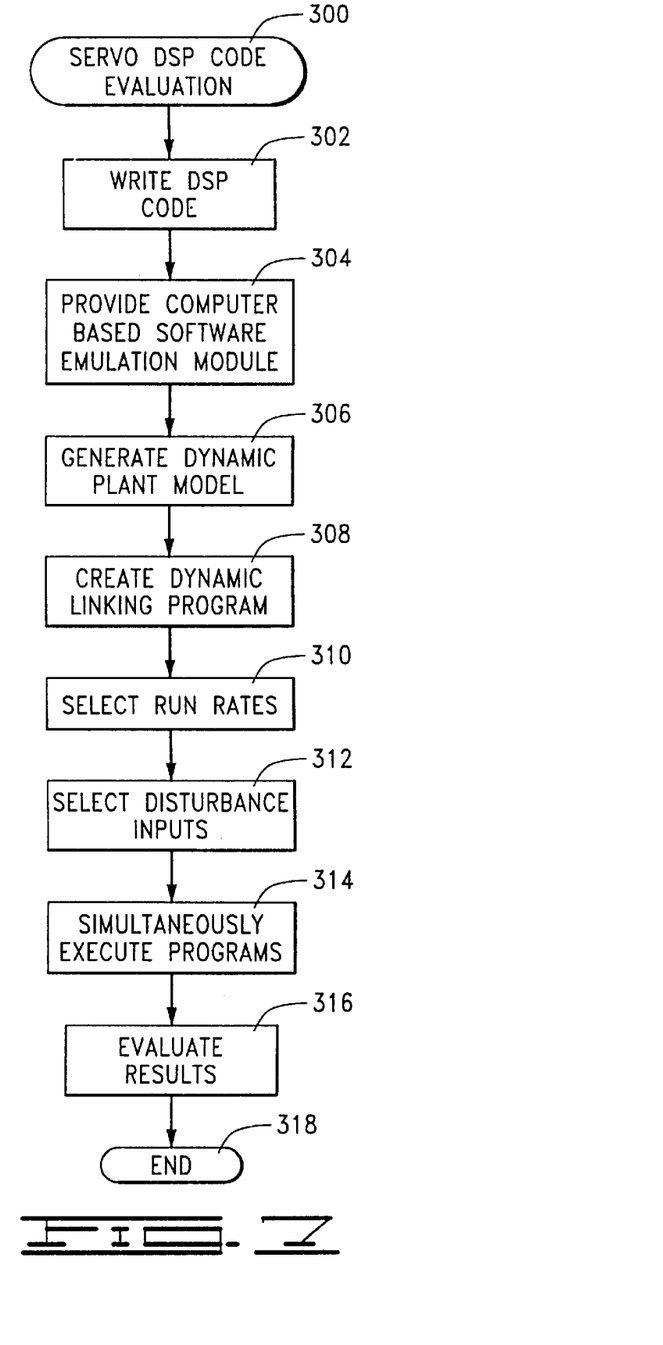
FIG. 7 is a flow chart for a SERVO DSP CODE EVALUATION routine, generally illustrative of steps carried out in accordance with preferred embodiments of the present invention.

A flow chart for a SERVO DSP CODE EVALUATION routine 300 is set forth in FIG. 7 to summarize the operation of the programming configuration of FIGS. 3–6. At step 302, the DSP code is first generated for use in a computer based software emulation module, step 304. A dynamic model of relevant electrical and mechanical portions is generated at step 306, and a dynamic linking program suitable for the dynamic model and emulation module is created and compiled at step 308.

The user next selects the respective run rates (processor cycles per time step) at step 310, and, as desired, selects additional inputs for the simulation run 312. Such inputs can include, for example, an external disturbance spectrum (injected by the disturbance block 260 of FIG. 6) to model the effects of externally applied vibration during the simulation run. The emulation module, dynamic plant model and linking program are thereafter simultaneously executed by the computer, step 314, and the user evaluates the results at step 316. The routine then ends at step 318.

It will now be clear that the present invention, as embodied herein, presents several significant advantages to a disc drive manufacturer during the development phase of a new disc drive design. First, the evaluation of the servo processor code using a "virtual" disc drive allows the code to be largely completed and debugged before the HDA mechanical design (basedeck, discs, actuator configuration) and the HDA electrical design (motor driver circuits, demodulation circuits) have been completely developed and are physically available. This can potentially allow elimination of what is historically referred to as the "bread board" stage of development, where engineering prototypes are generated in an attempt to physically create a first version of the disc drive before final design decisions have been fully made.

The present invention further allows a tremendous amount of data to be gathered in a very short amount of time. There can be literally thousands of tolerance combinations among the various electrical and mechanical components from a nominal design; in the past, disc drive manufacturers would have to build hundreds of disc drives and test these drives in laboratory conditions over an extended period of time to evaluate the various effects of these tolerances. By contrast, the plant model 202 can be readily adjusted and the interplay between these adjustments and the code can be immediately evaluated without ever building a single drive. The actual time scale can be adjusted as desired, and the time steps can be more frequent than the sampling periods normally used during actual drive operation. For purposes of illustration, the configuration of FIG. 3 can be run, for example, at a 2000/1 ratio, so that 2 milliseconds of disc drive operation can be simulated in 2 seconds.

Another significant advantage is the cost savings associated with the present invention in terms of emulation equipment. A typical emulation station (which allows a "processor emulator" to be physically plugged into the slot of the processor in a working drive) costs several tens of thousands of dollars and can only be used by a single user. By contrast, the present invention can be made available on-line within a design department, allowing multiple users to access the various libraries and files, using the commercially available, "off-the-shelf" emulation module and dynamic modeling programs. All that is generally required is the writing of the DSP code, the modeling of the plant characteristics, and the creation of appropriate *.dll and *.exe files, all of which are readily within the ability of those skilled in the art.

In accordance with preferred embodiments, the present invention is directed to a method and apparatus for evaluating programming 212 used by a programmable processor device 150 in a disc drive 100 to carry out servo control of a head 118 with respect to a rotatable disc 108 and to control spin-up and normal operation of a spindle motor 106 about which the disc 108 is journaled.

The programming is first generated as a series of instructions executable by the programmable processor device. Processor emulation software 200 is used to simulate execution of the instructions in a computer 206. A dynamic model of electrical and mechanical portions of the disc drive is generated using plant simulation software 202. A dynamic linking program 204 is configured to synchronize and transfer data between the processor emulation software and the plant simulation software. All three programs are thereafter executed simultaneously in the computer to evaluate real-time operation of the programming.

It will be clear that the present invention is well adapted to attain the ends and advantages mentioned as well as those inherent therein. While a presently preferred embodiment has been described for purposes of this disclosure, numerous changes may be made which will readily suggest themselves to those skilled in the art and which are encompassed in the spirit of the invention disclosed and as defined in the appended claims.

What is claimed is:

1. A method for evaluating programming used by a programmable processor device in a disc drive to carry out servo control of a head with respect to a rotatable disc, comprising steps of:

(a) generating the programming as a series of instructions executable by the programmable processor device;

(b) providing processor emulation software configured to simulate execution of the series of instructions by the programmable processor device, wherein the processor emulation software outputs current command signals indicative of current to be applied to an actuator motor used to control head position in response to position inputs indicative of head position;

(c) using plant simulation software to generate a dynamic model of electrical and mechanical portions of the disc drive including the head, the disc and the actuator motor, wherein the plant simulation software outputs head position signals indicative of head position in response to the current command signals;

(d) providing a dynamic linking program configured to transfer the current command signals from the processor emulation software to the plant simulation software and to transfer the head position signals from the plant simulation software to the processor emulation software; and (e) simultaneously executing the processor emulation software, the plant simulation software and the dynamic linking program in a computer to evaluate realtime operation of the programming.

2. The method of claim 1, wherein the instructions generated by generating step (a) comprises instructions used to carry out velocity control of the head during a seek operation and instructions used to carry out position control of the head during a track following operation.

3. The method of claim 1, wherein the dynamic model of using step (c) further models a power amplifier used to apply current to the actuator motor.

4. The method of claim 1, wherein the dynamic model of using step (c) further models a demodulator used to condition servo data from the disc to provide the head position signals.

5. The method of claim 1, wherein the dynamic model of using step (c) further models a spindle motor used to rotate the disc, and wherein the processor emulation software of providing step (b) further outputs spindle motor control signals to control the rotation of the spindle motor.

6. The method of claim 1, further comprising a step of:

(f) providing a disturbance spectrum to the plant simulation software to simulate externally applied vibration during the operation of the simultaneously executing step (e).

7. The method of claim 1, wherein the dynamic linking program is characterized as an executable (*.exe) file operable in a Microsoft Windows NT® version 4.0 compatible operating system environment.

8. An apparatus for evaluating programming used by a programmable processor device in a disc drive to carry out servo control of a head with respect to a rotatable disc, the programming comprising a series of instructions executable by the programmable processor device, the apparatus comprising:

a computer having a computer memory;

processor emulation software stored in the computer memory configured to simulate execution of the series of instructions by the programmable processor device, wherein the processor emulation software outputs current command signals indicative of current to be applied to an actuator motor used to control head position in response to position inputs indicative of head position;

plant simulation software stored in the computer memory and configured to generate a dynamic model of electrical and mechanical portions of the disc drive including the head, the disc and the actuator motor, wherein the plant simulation software outputs head position signals indicative of head position in response to the current command signals; and a dynamic linking program configured to transfer the current command signals from the processor emulation software to the plant simulation software and to transfer the head position signals from the plant simulation software to the processor emulation software, wherein the computer is configured to simultaneously execute the processor emulation software, the plant simulation software and the dynamic linking program to evaluate realtime operation of the programming.

9. The apparatus of claim 8, wherein the instructions executable by the programmable processor device comprise instructions used to carry out velocity control of the head during a seek operation and instructions used to carry out position control of the head during a track following operation.

10. The apparatus of claim 8, wherein the dynamic model further models a power amplifier used to apply current to the actuator motor.

11. The apparatus of claim 8, wherein the dynamic model further models a demodulator used to condition servo data from the disc to provide the head position signals.

12. The apparatus of claim 8, wherein the dynamic model further models a spindle motor used to rotate the disc, and wherein the processor emulation software further outputs spindle motor speed correction signals.

13. The apparatus of claim 8, wherein the dynamic linking program further provides a disturbance spectrum to the plant simulation software to simulate externally applied vibration during the simultaneous execution of the processor emulation software, the plant simulation software and the dynamic linking program.

14. The apparatus of claim 8, wherein the dynamic linking program is characterized as an executable (*.exe) file operable in a Microsoft Windows NT® version 4.0 compatible operating system environment.

15. The apparatus of claim 8, wherein the processor emulation software includes a user-defined Dynamic Link Library (*.dll) file operable in a Microsoft Windows NT® version 4.0 compatible operating system environment.

16. The apparatus of claim 8, wherein the plant simulation software includes a user-defined Dynamic Link Library (*.dll) file operable in a Microsoft Windows NT® version 4.0 compatible operating system environment.

* * * * *